US012365081B2

(12) United States Patent
Hölderle et al.

(10) Patent No.: US 12,365,081 B2
(45) Date of Patent: Jul. 22, 2025

(54) GUIDE RAIL FOR GUIDING A HAND-HELD POWER TOOL

(71) Applicant: Festool GmbH, Wendlingen (DE)

(72) Inventors: Rüdiger Hölderle, Aichelberg (DE); Björn Scherraus, Filderstadt (DE); Ondřej Kovács, Česká Lipa (CZ)

(73) Assignee: Festool GmbH, Wendlingen (DE)

( * ) Notice: Subject to any disclaimer, the term of this patent is extended or adjusted under 35 U.S.C. 154(b) by 443 days.

(21) Appl. No.: 17/792,187

(22) PCT Filed: Jan. 5, 2021

(86) PCT No.: PCT/EP2021/050092
§ 371 (c)(1),
(2) Date: Jul. 12, 2022

(87) PCT Pub. No.: WO2021/144167
PCT Pub. Date: Jul. 22, 2021

(65) Prior Publication Data

US 2023/0046097 A1 Feb. 16, 2023

(30) Foreign Application Priority Data

Jan. 13, 2020 (DE) ..................... 10 2020 100 574.1

(51) Int. Cl.
*B25H 1/00* (2006.01)
*B27B 9/04* (2006.01)

(52) U.S. Cl.
CPC .............. *B25H 1/0078* (2013.01); *B27B 9/04* (2013.01)

(58) Field of Classification Search
CPC ........ B25H 1/0078; B27B 9/04; B23D 47/02; B23D 51/02; B23Q 9/0014; B23Q 9/0042; Y10T 83/7872
USPC .................................. 30/289; 83/508.2, 851
See application file for complete search history.

(56) References Cited

U.S. PATENT DOCUMENTS 4,840,097 A * 6/1989 Campbell ............ B23Q 9/0085 83/522.18
9,475,140 B2 * 10/2016 Kume .................... B23D 59/00
2009/0049972 A1 2/2009 Thomas et al.
(Continued)

FOREIGN PATENT DOCUMENTS

CN 101352812 A 1/2009
CN 103246127 A 8/2013
CN 209836373 U 12/2019
(Continued)

OTHER PUBLICATIONS

Mafell—Cross-cutting system KSS 400 KSS 400 / 36 V—pp. 1-6.
Second Chinese Office Action of May 29, 2023.
Chinese Office Action dated Oct. 31, 2022.

*Primary Examiner* — Ghassem Alie
(74) *Attorney, Agent, or Firm* — Hoffmann & Baron, LLP

(57) ABSTRACT

A guide rail for guiding a hand-held power tool. The power tool includes a drive motor (23), a working tool (25), which is driven by the drive motor (23), and a protective cover (30) for the working tool. The protective cover can be moved between an open position (O) and a covering position (A), wherein the guide rail (60) has a stop assembly having at least one opening stop (81, 91) for moving the protective cover (30) into the open position (O) when the hand-held power tool (20) is moved along the guide axis (F).

26 Claims, 6 Drawing Sheets

(56) References Cited

U.S. PATENT DOCUMENTS

| | | | |
|---|---|---|---|
| 2012/0079931 | A1 | 4/2012 | Hansen |
| 2012/0240416 | A1 | 9/2012 | Okumura |

FOREIGN PATENT DOCUMENTS

| | | | | | |
|---|---|---|---|---|---|
| DE | 298 09 921 | U1 | | 11/1998 | |
| DE | 102 20 363 | A1 | | 12/2003 | |
| DE | 20 2010 008 772 | U1 | | 3/2011 | |
| DE | 20 2010 008 773 | U1 | | 3/2011 | |
| DE | 10 2014 010 486 | A1 | | 1/2016 | |
| EP | 2 965 865 | A2 | | 1/2016 | |
| EP | 2 974 924 | A2 | | 1/2016 | |
| GB | 2 437 934 | A | | 11/2007 | |
| JP | 2-15821 | U | | 1/1990 | |
| JP | 8-238604 | A | | 9/1996 | |
| JP | 2005-67108 | A | | 3/2005 | |
| JP | 2005-088122 | A | | 4/2005 | |
| JP | 2009-184319 | A | | 8/2009 | |
| JP | 2009178943 | A | * | 8/2009 | ............... B27B 9/04 |
| JP | 2018-075693 | A | | 5/2018 | |

* cited by examiner

GUIDE RAIL FOR GUIDING A HAND-HELD POWER TOOL

This application is a National Stage application based on International Application No. PCT/EP2021/050092, filed Jan. 5, 2021, which claims priority to DE 102020100574.1, filed Jan. 13, 2020.

BACKGROUND OF THE INVENTION

The invention relates to a guide rail for guiding a hand-held power tool, wherein the hand-held power tool comprises a drive motor, a working tool driven by the drive motor, and a protective cover for the working tool, which protective cover can be moved between an open position exposing the working tool and a covering position at least partially covering the working tool, wherein a rail body of the guide rail has, on opposite sides with respect to its center plane, a resting surface for laying onto a base surface, particularly onto a workpiece, and a guide surface provided for guiding the hand-held power tool, on which guide surface a guide contour for guiding the hand-held power tool along a guide axis is arranged such that the working tool of the hand-held power tool, guided parallel to the guide axis, can cut into the workpiece in a working direction adjacently to a longitudinal narrow side of the rail body, and wherein the guide rail has a stop assembly having at least one opening stop for moving the protective cover into the open position when the hand-held power tool is moved along the guide axis.

Such a guide rail is described in DE 10 2014 010 486 A1, for example. In practice, the system is designed as a so-called cross-cutting rail, for example. The hand-held power tool is a pendulum hacksaw with a pendulum hood as a protective cover, for example. When the hand-held power tool is moved forward along the guide rail, i.e. in the working direction along the guide axis, the opening stop opens the protective cover to such an extent that the working tool, for example a saw blade, can cut into the workpiece. The opening stop is formed, for example, by the workpiece and/or a rubber lip, past which the saw blade is moved when cutting into the workpiece, and at the same time the protective cover strikes the rubber lip in the meaning of opening or holding open the protective cover. When the hand-held power tool is moved in the reverse direction against the working direction, the protective cover again comes out of engagement with the rubber lip, which extends only over part of the guide rail, such that the protective cover closes again. A spring arrangement between the guide rail and the hand-held power tool tensions the hand-held power tool and the guide rail in the meaning of a movement against the working direction to an area of the guide rail without rubber lip, where the protective cover can return to the covering position. This protects the operator.

In practice, however, problems can arise in that the system consisting of guide rail and hand-held power tool does not move sufficiently quickly towards the starting position in which the opening stop no longer holds the protective cover open. Situations can then arise where the working tool is exposed and can injure the operator.

DE 102 20 363 A1 describes a guide rail which is designed to be flexible or thin in certain areas to be able to swivel a processing machine attached to the guide rail.

JP 2009-178943 A relates to a guide rail attachable to a workpiece and an electric saw.

SUMMARY OF THE INVENTION

It is therefore the problem of the present invention to provide an improved guide rail.

To solve the problem, the at least one opening stop provided in a guide rail of the type mentioned above can be adjusted on the rail body between a stop position intended for actuating the protective cover in the direction of the open position and a release position intended for releasing the protective cover for adjustment in the direction of the covering position, wherein the opening stop in the stop position projects further with a directional component parallel to the center plane of the rail body in front of the longitudinal narrow side of the rail body than in the release position.

The working tool is, for example, a saw blade, a cutting disc or other cutting tool, or the like. The rail body is preferably made of metal, in particular aluminum. The rail body of the guide rail is preferably designed as an extruded component.

The opening stop is arranged or mounted on the rail body such that it can be adjusted between the release position and the stop position.

In the stop position, the opening stop therefore projects transversely to the guide axis in a plane parallel to the guide surface or resting surface, the center plane, from the longitudinal narrow side. For example, the opening stop can be designed in the form of a narrow stop projection, a hook, an elongated stop, in particular an elongated stop surface or the like. The protective cover strikes the stop, for example, when the hand-held power tool is moved in the working direction along the guide rail.

It is advantageous if the at least one opening stop can be pivoted about at least one pivot axis with respect to the rail body between the stop position and the release position. The pivot axis is preferably parallel to the guide axis or transverse to the guide axis, in particular transverse at right angles. A pivot axis can easily also run at a flat, oblique angle to the guide axis. If multiple opening stops are present, they can also be pivoted about different pivot axes, for example one opening stop about a pivot axis parallel to the guide axis and another opening stop about a pivot axis running transverse to the guide axis, for example at right angles.

A pivot axis parallel to the guide axis is particularly advantageous if the opening stop extends along the longitudinal narrow side and/or has an elongated shape. For example, the opening stop can then pivot away, so to speak, from the stop position in the direction of the release position from the longitudinal narrow side of the guide rail towards its resting surface. In a typical use position of the guide rail, this opening stop pivots down.

A pivot axis transverse, for example, at right angles transverse to the guide axis is particularly advantageous if the opening stop is provided, as it were, for opening the protective cover for the first time, i.e. for adjusting it to its open position, at the start of a displacement movement of the hand-held power tool in the working direction along the guide rail.

Alternatively, however, it is also possible for the at least one opening stop to comprise an opening stop that can be moved or pivoted with respect to the rail body between the stop position and the release position. The opening stop can be moved linearly, for example. A superimposed pivot-slide movement can also be provided to move the opening stop between the stop position and the release position. The opening stop can, for example, be mounted on the rail body in the manner of a slide, which in the stop position projects in front of the longitudinal narrow side of the rail body and in the release position is moved back in the direction of the longitudinal narrow side of the rail body, in particular dipping into a cavity of the rail body.

The at least one opening stop or stop assembly may also include two or more opening stops.

Preferably, opening stops with equal degrees of freedom of movement are provided.

For example, two opening stops can be provided, both of which can be pivoted or deformed about a pivot axis parallel to the guide axis between the release position and the open position. The pivot axes of the opening stops can be coaxial or parallel to each other. An arrangement of multiple such opening stops is advantageous, for example, along the longitudinal narrow side of the guide rail, if multiple, for example two, opening stops are provided with respect to the guide axis or longitudinal axis of the guide rail, which are mounted independently of one another on the rail body about a pivot axis parallel to the guide axis.

However, it is also possible for the stop assembly to have two or more opening stops that have different degrees of freedom of movement with respect to the rail body for movement between the stop position and the release position. It is particularly advantageous if two opening stops are provided whose pivot axes, along which they can be deformed or pivoted relative to the rail body, are at an angle to each other, in particular at a right angle. For example, one opening stop can be pivoted or deformed about a pivot axis parallel to the guide axis, while another opening stop can be pivoted or deformed about a pivot axis at an angle to the guide axis, in particular at a right angle.

For pivotable mounting of an opening stop with respect to the rail body, a pivot bearing, for example with a bearing seat and a bearing shaft mounted in the bearing seat, is readily available. The pivot bearing can, for example, be designed in the manner of a piano hinge.

Furthermore, an opening stop can also have multiple pivot bearings, especially those whose pivot axes are parallel to each other. For example, sections of the opening stop may have bearing sections that engage with each other, such as in the manner of piano hinges.

A film hinge or a flexible connecting body that can be deformed relative to the pivot axis can also be used as a pivot bearing to support the opening stop such that it can pivot relative to the rail body.

However, the opening stop can also have a pivoting section that can be pivoted or deformed between the stop position and the release position about a pivot axis parallel to the guide axis.

Advantageously, the at least one opening stop has at least one longitudinal recess, in particular a groove, for pivoting or deforming movement between the release position and the stop position. The at least one longitudinal recess preferably runs parallel to the guide axis. Preferably, multiple longitudinal recesses are provided, preferably longitudinal recesses extending parallel to each other. The longitudinal recesses are designed, for example, as longitudinal grooves, notches, or the like.

It is also advantageous if the at least one opening stop for movement between the stop position and the release position is flexurally flexible or has a flexurally flexible section. The material of the flexurally flexible section or the flexural flexibility of the opening stop as a whole may be, for example, rubber, a flexurally flexible plastic, or the like. In particular, the flexurally flexible section is designed as a film hinge or has a film hinge.

It is advantageous if the stop assembly has at least one opening stop which can be moved from the stop position to the release position by the hand-held power tool when it is guided along the guide rail, in particular against the working direction. This opening stop is preferably mounted to pivot about a pivot axis on the rail body or with respect to the rail body, which axis extends transversely, in particular at right angles transversely, to the center plane of the rail body. In particular, the opening stop is designed in the form of a pawl. However, even when the hand-held power tool moves along the guide rail in the working direction or when the hand-held power tool is not moving with respect to the guide rail, it is advantageous if at least one opening stop is provided which can be moved by the hand-held power tool from the stop position to the release position if the opening stop is not supported against the force effect of the hand-held power tool, in particular its protective cover, for example if it is not supported by the workpiece.

It is further advantageous if at least one opening stop has an actuating bevel. The actuating bevel is provided, for example, to actuate the opening stop from the stop position to the release position, e.g. by the hand-held power tool. Furthermore, an actuating bevel on the opening stop can also be provided to actuate the protective cover in the direction of the open position.

In a preferred embodiment, the stop assembly or the at least one opening stop has at least two opening stops arranged in a row arrangement with respect to the guide axis on the rail body. The opening stops are arranged one behind the other with respect to the guide axis.

Advantageously, a first opening stop for opening the protective cover of the hand-held power tool and at least one second opening stop, arranged behind the first opening stop in the working direction for holding the protective cover in the open position, are provided. When the hand-held power tool is guided along the guide rail, the first opening stop opens the protective cover, which is then held open in the second opening stop acting downstream in the working direction. Both opening stops are in the stop position. Of course, the opening stops are mounted on the rail body such that they can move in the direction of the release position. At this point, it should also be mentioned that multiple second opening stops can also be provided, i.e. multiple opening stops arranged one behind the other in a row direction parallel to the guide axis to hold the protective cover in the open position. When the at least one second opening stop is moved to the release position, the protective cover can no longer strike it and is thus movable in the direction of the covering position.

If two or more opening stops are arranged in a row one behind the other, it is advantageous if they are firmly connected or motion-coupled to each other. This preferably implements a take-along movement, in that a first opening stop takes a second opening stop along in the direction of the release position or in the direction of the stop position when the first opening stop is moved into the release position or the stop position.

It is also advantageous if at least one opening stop of the stop assembly is spring-loaded in the direction of the stop position by a spring arrangement. Thus, the spring arrangement acts in the direction of the stop position, such that the opening stop is basically in the stop position for actuating the protective cover. However, the opening stop can be deflected in the direction of the release position against the spring force of the spring arrangement, for example manually or by the hand-held power tool, in particular when the latter moves against the working direction. It is advantageous if the stop assembly has a first opening stop that is spring-loaded by the spring arrangement in the direction of the stop position and is firmly connected or motion-coupled to a second opening stop. This allows the second opening stop to be loaded in the direction of the stop position by the spring arrangement of the first opening stop.

Advantageously, a spring force of the spring arrangement is lower than a force of the protective cover of the hand-held power tool provided for operation with the guide rail acting in the meaning of moving the opening stop into the release position, in particular a spring force and/or weight force. Thus, for example, if the protective cover is spring-loaded in the direction of the covering position and/or its weight bears on the opening stop, the spring force of the spring arrangement of the opening stop is such that the opening stop yields in the direction of the release position under the load of the protective cover of the hand-held power tool.

A wide range of options is available for the design of the spring arrangement:

For example, the spring arrangement may comprise a metallic spring, in particular a torsion spring. A torsion spring is preferably penetrated by a bearing member, in particular a bearing pin, of a bearing with which the opening stop loaded by the spring arrangement can be moved between the stop position and the release position.

To provide the resilient characteristic or resilient arrangement, an opening stop may also comprise resiliency. For example, the stop assembly comprises an opening stop which has a spring-elastic section or is made of a spring-elastic material and has its normal position in the stop position and can be elastically deformed into the release position.

It is also possible for the stop assembly to have two or more opening stops which are loaded into the stop position by separate spring arrangements. The spring arrangements can be identical in construction or different from each other. For example, one spring arrangement may comprise a metallic spring, while the other spring arrangement is formed by an elasticity of the opening stop.

The at least one opening stop can be fixed in the stop position and/or the release position by a fixing device. The fixing device can comprise, for example, a clamping screw, a clamping lever or the like. In particular, it is possible to hold the opening stop permanently in the release position by means of the fixing device, for example for transporting the guide rail, for specific operating modes or the like. However, fixing in the stop position can also be advantageous, i.e., the opening stop is regularly available for use. The fixing device may in particular comprise a latching arrangement. Of course, a combination of spring loading of the opening stop into the stop position or the release position and the addition of a fixing device is easily possible.

It is also advantageous if the stop assembly has at least one opening stop to which a counter stop is assigned, against which the opening stop strikes when it is moved from the release position to the stop position and/or when force is applied by the protective cover. The counter stop forms an abutment, so to speak. For example, the counter stop provides support for the opening stop when the protective cover strikes the opening stop during its movement from the covering position to the open position. Advantageously, this opening stop is spring-loaded in the direction of the stop position by the aforementioned spring arrangement.

There are many options for the design of opening stops, some of which are explained below.

Advantageously, for example, the opening stop can be designed in the form of a stop finger or stop bar, a pawl or the like. The opening stop can have a plate-like shape, for example.

In one advantageous concept, the at least one opening stop or multiple opening stops include(s) an actuating surface for actuating the opening stop in the direction of the stop position by the workpiece when the guide rail is resting on the workpiece. For example, the workpiece actuates the opening stop in the direction of the center plane of the guide rail so that it is in the stop position. When the guide rail is removed from the workpiece, the workpiece no longer actuates the opening stop into the stop position, such that the opening stop can move into the release position, in particular such that the opening stop automatically moves into the release position. This design is particularly advantageous for an opening stop that can be pivoted or deformed about a pivot axis parallel to the guide axis between the release position and the stop position. The actuating surface is arranged next to the resting surface of the guide rail, for example. The actuating surface is preferably in the same plane of the resting surface of the guide rail when the opening stop is in the stop position.

It should be mentioned, however, that manual actuation of the or an opening stop into the stop position and/or the release position can also be provided, i.e. that this opening stop can be manually moved into the stop position. It is also possible that the opening stop can only be moved manually to the stop position. The operator can therefore selectively move the opening stop between the stop position and the release position, regardless of the position of the guide rail in relation to the workpiece, for example.

It is also advantageous that the at least one opening stop is force-loaded in the direction of the release position, for example spring-loaded by a spring arrangement and/or loaded by a weight force, in particular caused by a dead weight of the opening stop. The arrangement is advantageously such that the weight force acts on the opening stop in the meaning of a movement from the stop position to the release position when the guide rail is oriented with its resting surface downwards.

It is advantageous if the at least one opening stop comprises an elongated stop body extending along the longitudinal narrow side of the guide rail. The stop body is preferably made of an elastic and/or flexurally flexible material, for example rubber, elastic plastic or the like, or comprises such a material. It is particularly advantageous if an elastic or flexurally flexible material is provided in the region of a pivot bearing section or pivot section of the stop body and/or in the region of a free side edge or narrow side which projects freely in front of the rail body. However, the stop body can also be made of metal or a material more resistant to bending or have such sections.

It is further advantageous to have a stop body that includes a hinge section, such as a film hinge. In particular, the aforementioned stop body made of an elastic or flexurally flexible material can have a hinge section or a film hinge.

Another advantage is an embodiment in which a row arrangement of multiple stop bodies arranged along the longitudinal narrow side of the guide rail is provided as opening stops. A row arrangement with at least two opening stops arranged along the longitudinal narrow side of the guide rail is therefore advantageous. The opening stops can comprise the same or different materials. For example, one opening stop can be made of metal, the other of plastic or a flexible material. The opening stops may overlap with respect to the row direction. For example, it is possible for a first opening stop in the working direction to cover or overlap a second opening stop in the working direction in a covering area or overlap area with respect to the guide axis. In the covering or overlap area, the two opening stops are preferably firmly connected to each other. However, it is also possible for opening stops arranged one behind the other with respect to the guide axis to be completely separate from one another and/or to be mounted on the rail body, such that they can move independently of one another.

In an embodiment of the guide rail with a stop body extending along the longitudinal narrow side, also in the form of a row arrangement of multiple stop bodies, for example at least two stop bodies, the stop bodies advantageously are plate-like.

It is advantageous if the stop assembly has an opening stop that has different bending stiffnesses with respect to the guide axis or has sections that are arranged one behind the other with respect to the guide axis and have different bending stiffnesses. For example, the opening stop with respect to the guide axis is made of different materials, for example metal and plastic. It is also advantageous if the opening stop has a stiffened and an unstiffened section one behind the other with respect to the guide axis. For example, the opening stop is made of flexurally flexible plastic or rubber and has a section stiffened, for example, by stronger plastic material, metal or the like.

It is also possible for the stop assembly to have at least two opening stops arranged one behind the other with respect to the guide axis, which opening stops have different bending stiffnesses. Preferably, the opening stops with different bending stiffnesses are fixed or coupled to each other.

It is advantageous if the stop assembly has an opening stop with a flexurally rigid support section extending parallel to the guide axis, the front longitudinal end of which in the working direction is provided for resting on the workpiece in such a way that, when the front longitudinal end of the support section rests on the workpiece, a rear longitudinal section of the support section, which projects freely in front of the workpiece and is not supported by the workpiece, is supported for holding in the stop position. Thus, the rear longitudinal section not supported by the workpiece can force the protective cover of the hand-held power tool into the open position or hold it in the open position. In particular, this configuration is advantageous when the guide rail is provided for inclined contact with respect to a rear workpiece side of the workpiece in the working direction, in which a longitudinal axis of the rear workpiece side and the guide axis are not at right angles. In this case, the opening stop may be to a large extent free to the rear in relation to the working direction, i.e. it is not supported by the workpiece in the direction of the stop position, but should nevertheless remain in the stop position in order to open the protective cover. The support section withstands the force applied by the protective cover of the hand-held power tool and holds it in the open position.

Preferably, the support section is at least about 50% of the longitudinal length, preferably at least about 75%, more preferably at least about 80% or 90% of the longitudinal length of the protective cover of the hand-held power tool intended for use with the guide rail with respect to the guide axis.

For example, the support section is formed by or has a metallic reinforcement of a stop body of the opening stop. It is preferred that, in front of the support section with respect to the working direction, a section of the stop assembly or opening stop is provided which is more yielding than the support section in the direction of the release position and which yields when force is applied by the protective cover of the hand-held power tool when this more yielding section does not rest on the workpiece and is thus supported by the workpiece into the stop position.

In the case of an elongated stop body extending along the longitudinal narrow side of the guide rail, the tear-out protection edge explained below is advantageous:

It is advantageous if the at least one opening stop has a tear-out protection edge for resting on the workpiece and for preventing the workpiece from being torn out at a cutting edge introduced into the workpiece by the working tool. The tear-out protection edge and/or a section of the opening stop that has the tear-out protection edge rests on the workpiece during working operation of the guide rail and, as it were, loads its upper side, which counteracts tearing out of the workpiece at the cutting edge.

Preferably, the tear-out protection edge is produced when the guide rail is used for the first time in connection with the hand-held power tool and its working tools. Advantageously, the at least one opening stop has a cutting section provided for cutting off by the working tool, which section is cut off by the working tool when the guide rail is used for the first time, when the working tool is guided along the guide rail along the guide axis. So, for example, if the cutting section is made of plastic or another such arguable material, the working tool, for example a saw blade, can cut this cutting section to length to produce the tear-out protection edge.

It is further advantageous if the guide rail has an attachment area or initial section. The attachment area is used, for example, to attach the guide rail to the workpiece. When the hand-held power tool is located in the attachment area or initial section of the guide rail, it is prepared, so to speak, to carry out the saw cut or is in the start position. Preferably, no body actuating the protective cover projects in front of the longitudinal narrow side of the rail body in the attachment area or initial section, such that when the hand-held power tool is arranged at the attachment area or initial section, the protective cover is freely movable between the release position and the covering position, it can be moved into the covering position by a protective cover spring arrangement, for example. Preferably, no element of the stop assembly is arranged in the initial section or attachment section. Thus, the stop assembly preferably extends over longitudinal sections of the guide rail which are different from the attachment area or initial section with respect to the guide axis. It is advantageous if the stop assembly extends along the guide rail over the entire length of the guide rail suitable for introducing a saw cut into the workpiece, apart from the attachment area or initial area, in particular up to a longitudinal end of the guide rail at the front in the working direction.

Advantageously, one or more rearward-engaging contours are provided in the guide rail for engagement in a mating rearward-engaging contour of the hand-held power tool. The rearward-engaging contour and the mating rearward-engaging contour are complementary to each other. They fit positively into each other, but have a movement clearance in relation to the guide axis when engaged with each other. When the rearward-engaging contour engages in the mating rearward-engaging contour of the hand-held power tool, the latter is held on the guide rail in a normal direction with respect to the center plane of the guide rail. Thus, the hand-held power tool remains movable along the guide axis on the guide rail. Nevertheless, the guide rail is held captive, so to speak, on the hand-held power tool. In the case of the hand-held power tool, mating rearward-engaging contours matching the rearward-engaging contour are provided. For example, the rearward-engaging contour and the mating rearward-engaging contour have a T-shaped shape, a V-shaped shape, are designed as dovetail contours, or the like. This means that highly flexible operation is possible with such a configuration of guide rail and hand-held power tool. For example, the guide rail forms a so-called cross-cutting rail. In this embodiment of the invention, the guide rail is preferably short. A longitudinal length of the guide rail with respect to the guide axis is three or four times as great as a longitudinal length of the hand-held power tool, for example.

It is also advantageous if the guide rail has at least one longitudinal end stop for stopping the hand-held power tool during a movement in the working direction or against the working direction. Thus, the hand-held power tool can no longer be moved beyond the guide rail forward in the working direction and/or backward against the working direction, for example. The longitudinal end stop(s) can be provided for a slide of the guide rail that can be connected to the hand-held power tool and is guided on the guide rail. When the hand-held power tool is connected to the slide, the latter strikes the respective longitudinal end stop and thus limits the displacement path of the hand-held power tool with respect to the guide rail.

Advantageously, the guide rail has a spring-loaded resetting device for adjusting the hand-held power tool in the direction of a rear longitudinal end region of the guide rail in the working direction. A fastening device for an actuator, for example a flexurally flexible actuator, in particular a cable, of the resetting device is provided on the hand-held power tool. During working operation, the hand-held power tool is actuated against the force of the resetting device from the rear longitudinal end region to the front longitudinal end region of the guide rail in the working direction. If the operator and/or the workpiece do not exert any positioning force on the system of guide rail and hand-held power tool in the forward working direction, the resetting device returns the system consisting of guide rail and hand-held power tool to the starting position, so to speak, in which the hand-held power tool is arranged at the rear longitudinal end region of the guide rail. Thus, for example, when the hand-held power tool with the guide rail is removed from the workpiece with the operator holding the hand-held power tool by a handle thereof, the guide rail comes free from the workpiece such that the resetting device can adjust the guide rail relative to the hand-held power tool such that the rear longitudinal end region of the guide rail in the working direction comes under the hand-held power tool, so to speak.

The invention further relates to a system comprising a guide rail of the above type and a hand-held power tool. In particular, the hand-held power tool of this system or for use with the guide rail is designed as a pendulum hood saw. The hand-held power tool preferably is a pendulum hood saw.

The protective cover of the hand-held power tool is preferably spring-loaded in the direction of its covering position by a protective cover spring arrangement. The one or more opening stops can be used to move the protective cover, for example a pendulum hood, from the covering position to the open position. In the system, an actuating force of the protective cover, with which the protective cover acts on the at least one opening stop in the open position, is advantageously greater than a holding force of the at least one opening stop in the direction of the stop position when the opening stop projects freely and/or unsupported and/or without support in front of the rail body. The holding force is provided, for example, by a spring elasticity of a stop body of the opening stop and/or by a spring arrangement tensioning the opening stop into the stop position. The actuation force includes a weight force of the protective cover and/or a spring force of the protective cover spring assembly, for example.

BRIEF DESCRIPTION OF THE DRAWINGS

An exemplary embodiment of the invention is explained below with reference to the drawing. Wherein.

DETAILED DESCRIPTION

Figure 1:
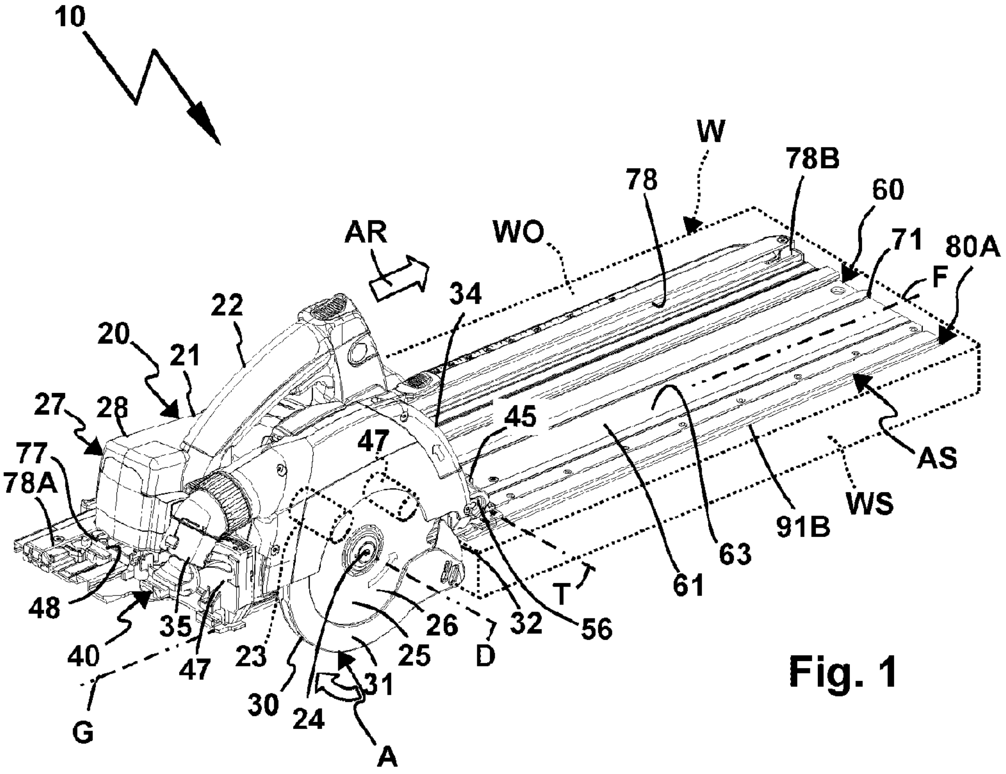
FIG. 1 shows an oblique perspective view of a guide rail with a hand-held power tool before cutting into a workpiece.

A hand-held power tool 20 is configured as a sawing machine 21, for example. The hand-held power tool 20 comprises a drive assembly 22 with a drive motor 23. The drive motor 23 drives, either directly or via a gearbox not shown in the drawing, a tool holder 24 to which a working tool 25 is detachably attached, for example a saw blade 26. The tool holder 24 rotates about an axis of rotation D.

Figure 2:
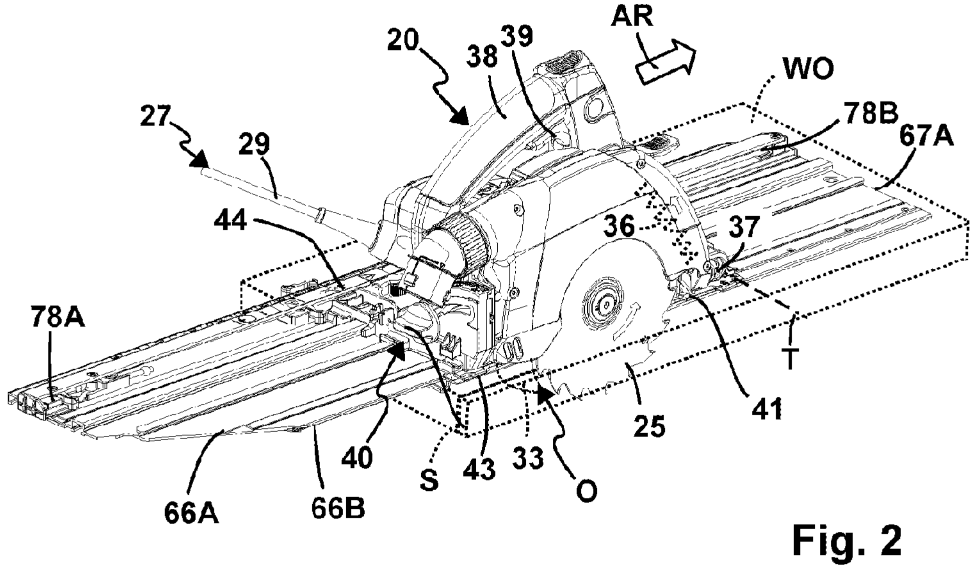
FIG. 2 shows the arrangement according to FIG. 1, wherein the tool of the hand-held power tool already cuts into the workpiece.

For power supply to the hand-held power tool 20, a power supply unit 27 is provided, which may comprise a rechargeable energy storage 28, in particular a battery pack or the like, for example. Without further ado, however, a power cord 27 for connection to an electrical power supply network, for example an AC power supply network, is also possible, which is shown in the variant according to FIG. 2. It is also possible that the hand-held power tool 20 is a hybrid machine that can be operated both by means of a mobile energy storage device and by means of an electrical supply network. In any case, a high degree of mobility of the hand-held power tool is advantageous, such that it can be easily moved toward and away from a workpiece W, especially when no power cord 29 is necessary.

The working tool 25 is a saw blade, for example. The hand-held power tool 20 is a circular saw, a plunge saw or the like, for example. It is particularly advantageous if the hand-held power tool 20 is a pendulum hood saw. Instead of the saw blade 26, another cutting tool, for example a cutting disk or the like, could also be provided.

The working tool 25 is advantageously covered by a protective cover 30 when the working tool 25 is not used to cut into the workpiece W. Indeed, even then, the drive motor 23 may be running and thus driving the working tool 25 such that teeth or other such cutting means disposed on its outer periphery may injure a user.

The drive assembly 22 is arranged on a guide plate 40, which can be guided directly on the workpiece W, but can also be guided on a guide rail 60. The drive assembly 22 is disposed on an upper surface 41 of the guide plate 40, while the lower surface 42 opposite to the upper surface 41 is provided for guiding along the workpiece W or the guide rail 60. During working operation of the hand-held power tool 20, i.e. for cutting into the workpiece W, the working tool 25 projects in front of a longitudinal side 43 of the guide plate 40 towards the lower surface 42, such that it can cut into the workpiece W there. The drive assembly 22, on the other hand, extends from the longitudinal side 44 to a longitudinal side 44 opposite thereto, but advantageously does not project in front of said longitudinal side 44.

A stationary upper hood 34 is provided on an area of the hand-held power tool facing away from the upper surface 41, in which a section of the tool 25 projecting in front of the upper surface 41 of the guide plate 40 is received. A suction connection 35 is preferably arranged on the hood 34 for connecting a suction hose, a dust collection bag or the like.

The section of the tool 25 that may project in front of the lower surface 42 can be concealed by a movable protective cover 30. The protective cover 30 can be moved between a covering position A (FIG. 1) covering the working tool 25 and an open position O (FIG. 2) fully or partially exposing the working tool 25 and is accordingly movably mounted with respect to the stationary upper hood or the stationary upper protective cover. The protective cover 30 can pivot about a pivot axis DH parallel or coaxial to the axis of rotation D of the tool holder 24, namely between the covering position A and the open position O.

The protective cover 30 is designed as a hood, in particular a pendulum hood, for example. A stop 32 is arranged on the hood 31 or the protective cover 30 at a front area of the hood 31 in the working direction AR, namely in orientation to the front transverse side 46 of the guide plate 40. At this stop 32 or as the stop 32, a splitting wedge 33 is further advantageous, which wedge can engage in a saw slot or saw cut S which is sawed into the workpiece W by the working tool 25.

The protective cover 30 is loaded into its covering position A by a protective cover spring assembly 36. The protective cover spring assembly 36, shown only schematically in the drawing, includes one or more springs, one or more actuating arms, actuating joints, or the like, for example, for actuating the protective cover 30 or pendulum hood 31 from the open position toward the covering position.

At an area away from the guide plate 40, the hand-held power tool 20 has a handle 38 for gripping by an operator. A switch 39, for example a pressure switch, is arranged on the handle 38 for switching the drive motor 22 on and off, preferably also for adjusting its speed.

The drive assembly 22 is depth adjustable with respect to the guide plate 40. For example, the drive assembly 22 is pivotally mounted to the guide plate 40 by a depth adjustment bearing 37. The depth adjustment bearing 37 allows the drive assembly 22 to pivot about a depth adjustment axis T. Preferably, the depth adjustment bearing 37 is arranged at the front in the working direction, i.e. close to the front transverse side 46 of the guide plate 40, such that the hand-held power tool in this case represents a typical pendulum hood saw. However, the invention can also be readily implemented in a saw in which the depth adjustment bearing is arranged at the rear in the working direction, or in a saw whose drive assembly or saw assembly is guided linearly relative to the guide plate, for example.

Furthermore, the drive assembly 22 is pivotable about a miter axis G by means of miter bearings 47. In a typical working mode shown in the drawings, the working tool 25 projects at a right angle in front of the lower surface 42. However, the miter bearings 47 can also be used to set miter angles, for example up to 45° or 47°. A rear miter bearing 47 is located near a rear transverse side 45 of the guide plate, and a front miter bearing is located closer to the front transverse side 46 of the guide plate below the drive assembly 22.

A guide rail 60 is used to produce an exact, straight-line saw cut S in a workpiece W. The hand-held power tool 20 and guide rail 60 may remain permanently coupled to each other during operation, forming a system 10.

The guide rail 60 has a substantially flexurally rigid rail body 61 made of metal or hard plastic, which can be placed with a resting surface 62 on a substrate, for example on an upper workpiece side WO of the workpiece W. The resting surface 62 and a guide surface 63 are opposite to each other with respect to a center plane MI of the rail body 61.

The guide surface 63 is used to guide the hand-held power tool 20. A guide contour 70 is provided on the guide surface 63, which is designed and provided for engagement with a mating guide contour 50 of the hand-held power tool 20. For example, the guide contour 70 includes a longitudinal rib extending parallel to longitudinal narrow sides 64, 65 of the rail body 61 along the guide axis F. When the hand-held power tool 20 rests on the guide surface 63, the guide contour 70 engages the mating guide contour 50 during operation, which is designed, for example, as a U-shaped groove extending in the longitudinal direction of the guide plate 40. Thus, the working tool 25 can project past the longitudinal narrow side 64 of the rail body 61 and thus of the guide rail 60 in front of the resting surface 62, cut into the workpiece W and produce a saw cut S which is parallel to the guide axis F.

The hand-held power tool 20 can be oscillatingly guided back and forth between a rear transverse narrow side 66 and a front transverse narrow side 67 of the guide rail 60 or the rail body 61.

Figure 3:
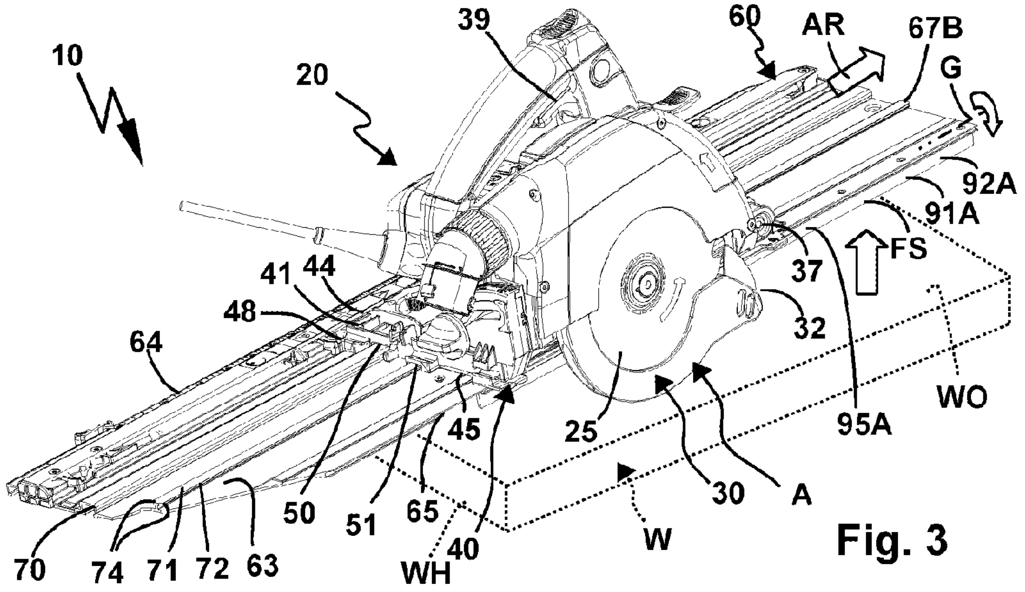
FIG. 3 shows an oblique perspective view of the hand-held power tool and the guide rail during removal from the workpiece.

To ensure that the guide rail 60 and the hand-held power tool 20 remain connected to each other even when the system 10 is lifted off the workpiece W, see FIG. 3 for example, rearward-engaging contours 72 are provided on the guide rail 60 and mating rearward-engaging contours 52 are provided on the hand-held power tool, e.g. on the guide plate 40, for engagement with the rearward-engaging contours 72 of the guide rail 60. The rearward-engaging contours 72 are provided on a guide projection 71. The guide projection 71 extends along the longitudinal length of the guide rail 60 with respect to the guide axis F.

The rearward-engaging contours 72 include a longitudinal leg 73 projecting in front of the guide surface 63, from which transverse legs 74 protrude. The longitudinal leg 73 and the transverse legs 74 form a T-shaped configuration that complementarily fits a T-shaped guide receptacle 51, which provides the mating rearward-engaging contour 52 of the hand-held power tool 20. The mating rearward-engaging contour 52 has a longitudinal leg 53 for the longitudinal leg 73, and side receptacles 54 or transverse legs into which the transverse legs 74 of the rearward-engaging contour 72 can engage. When the rearward-engaging contours 72 and mating rearward-engaging contours 52 are engaged with each other, the hand-held power tool 20 is held on the guide rail 60 with respect to a normal direction N of the guide surface 63 or the center plane MI. Thus, when the hand-held power tool 20 is lifted off the workpiece W, it takes the guide rail 60 along.

A slope 66A runs between the rear transverse narrow side 66 and the longitudinal narrow side 65, which provides a viewing area of the workpiece W, for example.

An operator of the system 10 manually guides the hand-held power tool 20 forward along the guide axis F in the working direction AR, for example. The guide rail 60 is supported on the workpiece W, for example, by means of the stops 68, 69.

A resetting device 75 acts in the opposite direction, i.e. against the working direction AR. The resetting device 75 is configured to adjust the relative position of the hand-held power tool 20 and the guide rail 60 in such a way that the hand-held power tool 20 is moved into the attachment area 66B, in particular when the guide rail 60 is unloaded, i.e. lifted off the workpiece W, for example. The resetting device 75 is fixedly attached to the guide rail 60 and includes a flexible tension member 76, such as a belt or the like, connected to a carriage 77. The carriage 77 is guided along the guide axis F on a guide 78, for example a guide rib, guide groove or the like, of the guide rail 60. The tension member 76 is spring-loaded by a spring 79 in such a way that it loads the carriage 77 in the direction of the rear transverse side or transverse narrow side 66 in the working direction AR.

The hand-held power tool 20 includes a retaining contour 48, for example on the saw table or the guide plate 40 for connection to the carriage 77. For example, the carriage 77 includes a latch receptacle or the like engageable with the retaining contour 48. Stops 78A, 78B are provided for the carriage 77 to limit the travel path of the hand-held power tool 20 with respect to the guide rail 60, for example at the longitudinal end regions of the guide 78 in the region of the front and rear transverse narrow sides 67, 66.

The guide rail 60 can be attached to the workpiece W in different angular positions. For setting the respective angular positions, stops 68, 69 are provided which project in front of the resting surface 62. The stop 68 is arranged stationary in the area of the longitudinal narrow side 65. The longitudinal stop 69 is arranged on the opposite longitudinal narrow side 64 so as to be adjustable between a plurality of longitudinal positions with respect to the guide axis F. The stops 68, 69 are designed, for example, as stop bodies which project in front of the resting surface 62 such that the guide rail 60 can be placed against a surface lateral to the upper workpiece side WO while the stops 68, 69 are in contact.

If the stops 68, 69 have the same longitudinal positions with respect to the guide axis F, a saw cut S orthogonal to a rear workpiece side WH can be sawn into the workpiece W, for example. Then the guide rail 60 assumes an angular position WP1, for example.

However, other angular positions, for example angular positions WP2 and WP3, can also be set. For this purpose, the stop 69 is adjustable relative to the longitudinal narrow side 64, for example in positions P1, P2 and P3. For example, several holding fixtures can be provided for the longitudinal stop 69. Preferably, however, a guide 69A is provided in which the longitudinal stop 69 can be moved. By means of a clamping screw 69B, for example, the longitudinal stop 69 can be fixed in position relative to the guide 69A, in particular clamped therein. The guide 69A is designed, for example, as a retaining groove or receiving groove.

Figure 4A:
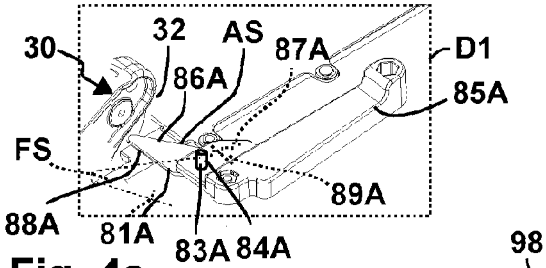
FIG. 4*a* shows an enlarged detail D1 from FIG. 4.
Figure 4:
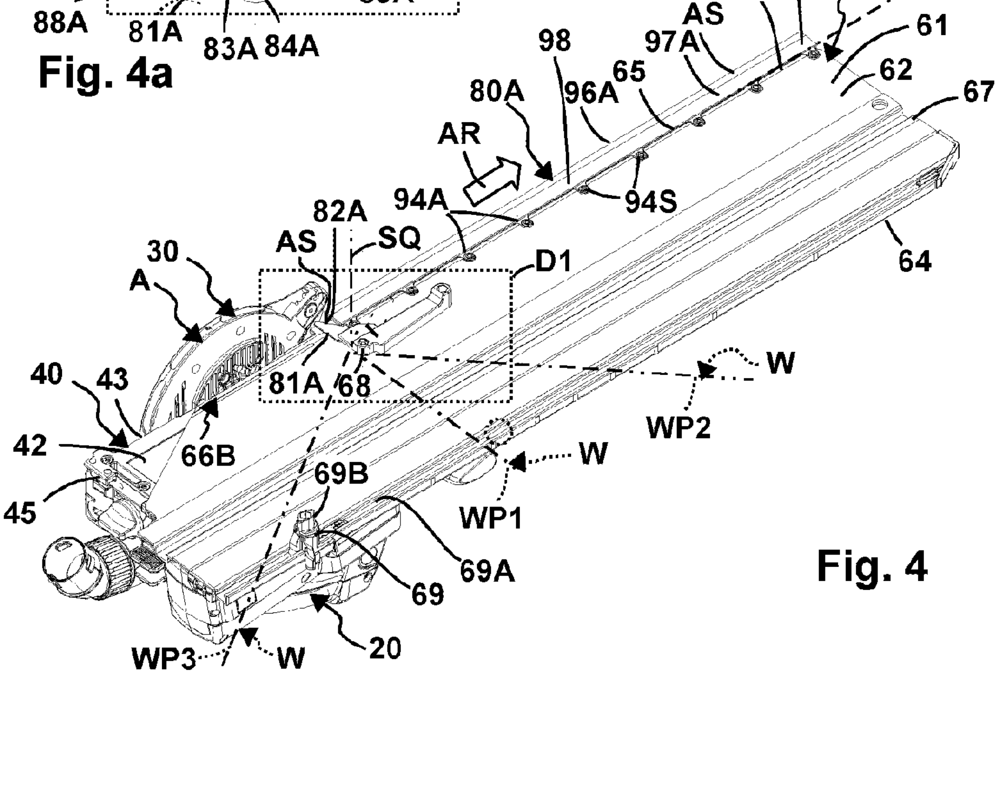
FIG. 4 shows a bottom view of the guide rail and the power tool according to the above figures.
Figure 5:
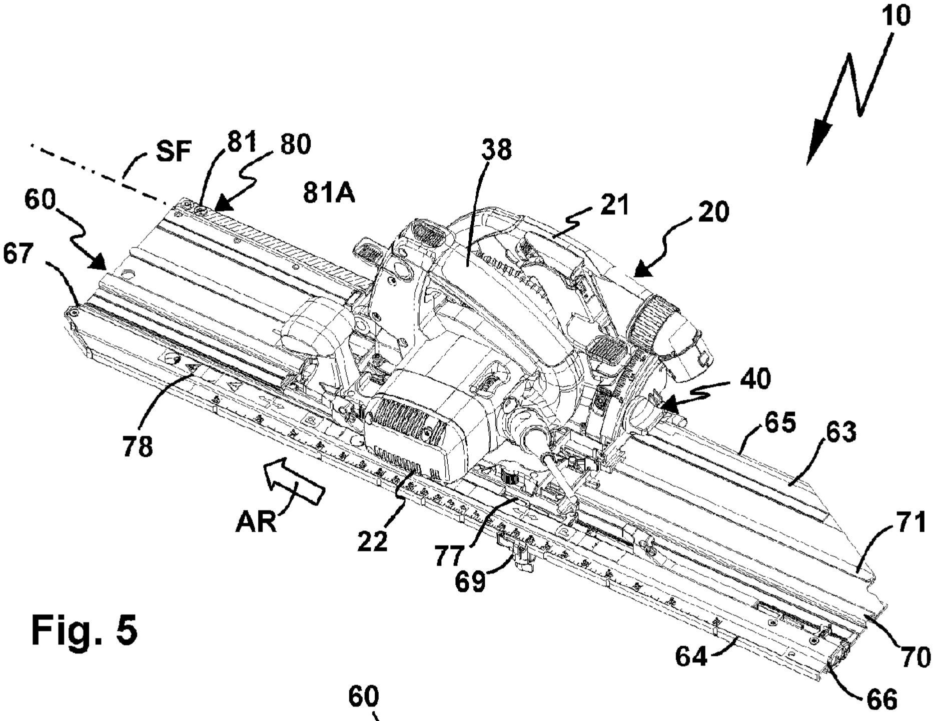
FIG. 5 shows an oblique perspective view from above of the hand-held power tool and the guide rail according to the above figures.
Figure 6:
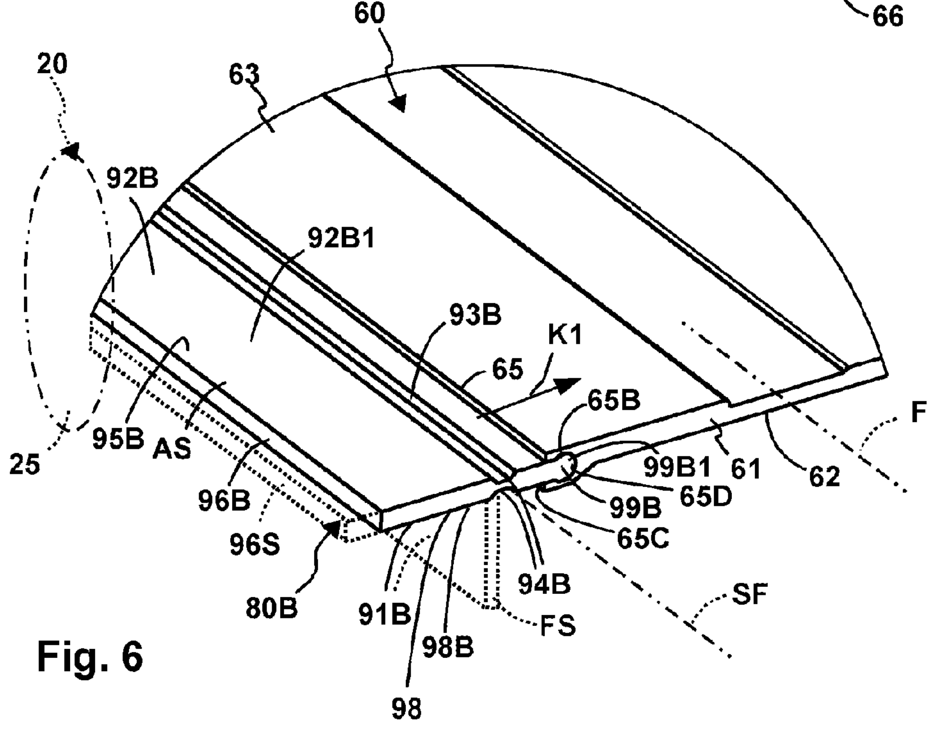
FIG. 6 shows a front detail of a first variant of a modification of a guide rail with an opening stop.
Figure 7:
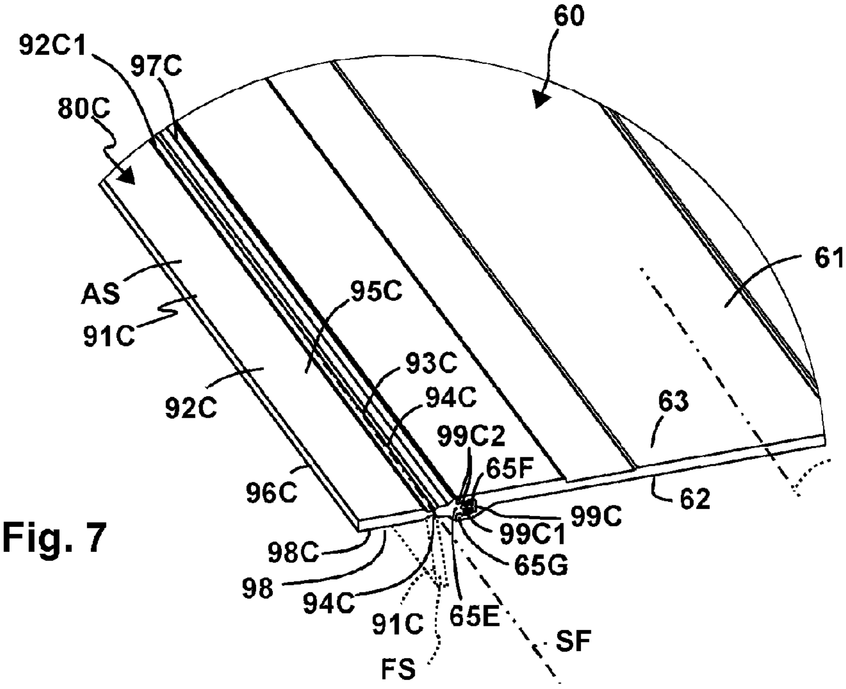
FIG. 7 shows a detailed view similar to FIG. 6, but with a second variant of a guide rail and an opening stop.

For example, the angular position WP1 lies between the angular positions WP3 shown in FIG. 4. In each of the angular positions WP1-WP3, an attachment area 66B projects freely in front of the rear workpiece side WH, while a front portion 67B of the guide rail 60 is supported on the workpiece surface WO.

In the rear attachment area 66B, the protective cover 30 is preferably closed, i.e. assumes its covering position A, see FIG. 1 or FIG. 4, for example. Then the working tool 25 is covered by the upper hood 34 and the pendulum hood 31, and the operator is protected from injury. However, when the saw cut S is to be carried out, the operator guides the hand-held power tool in the working direction AR towards the front section 67B of the guide rail 60, moving the protective cover 30 from the covering position A to the open position O. For example, the stop 32 of the protective cover 30 can strike the rear workpiece side WH, as a result of which the pendulum hood 31 or protective cover 30 is actuated from the covering position A in the direction of the open position O or pivots open and is held in the open position O during the further movement of the hand-held power tool 20 in the working direction AR.

Stop assemblies 80A, 80B, 80C, 80D, 80E are provided for opening and/or holding open the protective cover 30 in the open position O, more generally also referred to as stop assembly 80. The stop assemblies 80 include opening stops 81, 91, which are designated by the additional letters A-E corresponding to the respective stop assembly 80A-80E to distinguish them. The opening stops 81, 91 are adjustable between a stop position AS, which is provided for opening or holding the protective cover 30 in the open position O, and a release position FS, in which the protective cover 30 can move from the open position to the covering position A or remain in the covering position A.

The stop assembly 80A includes opening stops 81A and 91A.

The opening stop 81A is arranged between the opening stop 91A and the attachment area 66B and used to open the protective cover 30, so to speak. The opening stop 81A can be moved between a stop position AS, in which it projects parallel to the center plane MI of the rail body 61 in front of the longitudinal narrow side 65 of the rail body 61, and a release position FS, in which it is adjusted towards or back behind the longitudinal narrow side 65 to such an extent that it can no longer engage with the protective cover 30, in particular its stop 32. The release position FS is shown as a dashed line in FIG. 4*a*.

The opening stop 81A comprises a stop body 82A, which is pivotally mounted about a pivot axis SQ on a pivot bearing 83A. The pivot bearing 83A includes, for example, a bearing body 84A on which the stop body 82 is pivotally mounted. The bearing body 84A, for example a bearing axle member, is held or received in a bearing housing 85A, the longitudinal end of which facing the shoulder region 66B provides the longitudinal stop 68. For example, the bearing housing 85A is bolted to the rail body 61, glued thereto, or the like.

The stop body 82A is designed in the manner of a latch, for example. The stop body 82A has an actuating bevel 86A, which is provided by the hand-held power tool 20 for deflecting the stop body 82A and thus for actuating the opening stop 81A in the direction of the release position FS when moving against the working direction AR. The opening stop 81A is loaded in the direction of its stop position AS by a spring or spring arrangement 87A. Thus, when the opening stop 81A is unloaded by external influences, the spring arrangement 87A moves the stop body 82A in the direction of the stop position AS, in which the stop body abuts against a counter stop 89A, for example of the bearing housing 85A. In this position, in any case, the stop 32 of the protective cover 30 can strike against the actuating surface 88A of the stop body 82A, which is opposite to the actuating slope 86A, such that it is moved from the covering position A in the direction of the open position O.

The stop body 82A is for example made of metal or, in any case, a harder material than a stop body 92A of the opening stop 91A. The stop body 92A is made, for example, of rubber, plastic, or another such soft material. The stop body 92A is configured as a flat plate-like body or plate bodies, for example.

The opening stop 91A extends along the longitudinal narrow side 65 between the opening stop 81A and the front transverse narrow side 67 or the front longitudinal end of the guide rail 60 in the working direction AR. On the path of movement between the opening stop 81, the protective cover 30 or its stop 32 slides along an upper surface 95A of the opening stop 91, which rests on the workpiece W. In the process, the working tool 25, i.e. the saw blade 26, is moved past a side edge 96A of the opening stop 91A, which represents a free side edge, so to speak, of the guide rail 60 in working mode. For example, the side edge 96A can serve as a tear-out protection by resting on the workpiece surface WO and by also being subjected to force by the protective cover 30 in the direction of the workpiece surface WO such that the plate body or stop body 92A rests flatly on the workpiece surface WO.

The opening stop 91A is arranged on the rail body 61 so as to be pivotable about a pivot axis SF, which runs parallel to the guide axis F, and is thus movable between a stop position AS, in which the plate body or stop body 92A is substantially aligned with the rail body 61, i.e. projects far in front of the longitudinal narrow side 65 of the rail body 61, and a release position FS, in which the stop body 92A is pivoted, for example, towards the lower surface or resting surface 62 of the guide rail 60, such that its upper side 95A is oriented at an angle, in particular approximately at right angles, to the guide surface 63, for example. For pivotable mounting of the stop body 92A, a pivot bearing 93 is provided which comprises multiple bearing elements 94A arranged one behind the other in a row direction parallel to the guide axis F. The bearing elements 94A are screwed or riveted to the rail body 61, for example by means of screws 94S. The bearing elements 94A may be provided, for example, by flexurally flexible projections of the stop body 92A.

A lower surface 98A of the stop body 92 opposite to the upper surface 95A serves as an actuating surface 98 for actuating the opening stop 91A from the release position FS into the stop position AS. Namely, when the lower surface 97A rests on the workpiece surface WO, the opening stop 91A is supported in the stop position AS and cannot avoid a force applied by the protective cover 30 in the direction of the release position FS. However, when the guide rail 60 is lifted from the workpiece surface WO, this support of the opening stop 91A by the workpiece W is eliminated, i.e., the stop body 92 pivots about the pivot axis SF from the stop position AS to the release position FS. As a result, the pendulum hood 91 or protective cover 30 is no longer supported in its open position O, such that the dead weight of the protective cover 30 and the protective cover spring assembly 36 automatically move the protective cover 30 in the direction of the covering position A. This protects the operator from injury.

It is possible that the bearing elements 94A have a resilient property, such that they represent a spring arrangement 97A that basically biases the stop body 92A in the direction of the stop position AS or at least acts with a certain force in the direction of the stop position AS, for example. However, this force is less than the force applied to the upper surface 95A by the protective cover 30 when the stop body 92 is not supported on its actuating surface 98 or lower surface 98A.

In contrast, a somewhat simpler concept has been chosen for the stop assembly 80B. The stop assembly 80B has only a single opening stop 91B, which is similar to the opening stop 91A and has likewise an elongated stop body 92B which extends substantially over the entire longitudinal length of the guide rail 60 between the attachment area 66B, where the longitudinal narrow side 65 is exposed, and the forward longitudinal end of the guide rail 60 in the working direction AR, that is, to the forward transverse narrow side 67.

The opening stop 91B is pivoted by means of a pivot bearing 93B between a stop position AS, in which the stop body 92B is substantially aligned with the surfaces 62, 63 of the rail body 61, and a release position FS, in which the free side edge 96B of the plate body or stop body 92B projects less far in front of the longitudinal narrow side 65 of the rail body 61, such that the protective cover 30 of the hand-held power tool 20 can move past the opening stop 91A from its open position O into the covering position A or can remain in the covering position A.

The stop body 92B has an actuating surface 98 on its lower surface 98B, which is provided to rest against the workpiece surface WO and, supported by the workpiece surface WO, ensures that the opening stop 91B is supported in the stop position AS and remains in this position.

The pivot bearing 93B is formed by recesses 94B on the upper surface 95B and the lower surface 97B of the stop body 92B. The recesses 94B are designed in the manner of longitudinal grooves running parallel to the guide axis F, for example.

The recesses 94B are disposed between a pivot section 92B1 of the stop body 92B, which is pivotable between the release position FS and the stop position AS, and a fastening section 99B for fixing to the rail body 61.

The fixing section 99B of the stop body 92B is received in a receptacle 65B of the rail body 61. The receptacle 65B is configured as a receptacle groove extending along the longitudinal narrow side 65, for example. The receiving groove or receptacle 65B is preferably approximately keyhole-shaped in cross-section. In any case, it is preferred that the stop body 92B is held positively in the receptacle 65B with a force component K1 parallel to the center plane MI.

For example, an opening 65C of the receptacle 65B towards the longitudinal narrow side 65 is narrower in cross-section than a bottom region or receiving area 65D of the receptacle 65B facing away therefrom, in which a bead-like rearward-engaging section 99B1 of the fastening section 99B engages, for example. Consequently, the fastening section 99B can be inserted from one of the transverse narrow sides 66 or 67 into the receptacle 65B along an insertion axis parallel to the guide axis F, but is held in the receptacle 65B transversely to said insertion axis in a form-fitting and/or captive manner. However, bonding, welding, or other such additional fastening measure may easily be provided to hold the stop body 92B in the receptacle 65B, for example, by means of a material bond. Clamping with one or more clamping bodies, screws or the like, which are screwed or inserted in particular from one of the surfaces 62 or 63 in the direction of the receptacle 65B, is also easily possible, for example.

The stop body 92B is preferably made of a material that can be cut by the working tool 25 or saw blade 26, for example plastic, rubber or the like. Thus it is possible, for example, that the working tool 25 can cut a cutting section 96S from the stop body 92B during a first saw cut when the hand-held power tool 20 is guided along the guide rail 60 to thereby form the side edge 96B. This then has an optimum length transverse to the guide axis F for a subsequent sawing operation, such that it always runs laterally next to the working tool 25 and close to the latter, for example, and forms a tear-out protection which prevents or at any rate significantly reduces tear-out of the workpiece W in the region of the saw cut S.

A stop body 92C of the stop assembly 80C used as an opening stop 91C for the protective cover 30 is substantially the same as the stop body 92B, for example, has recesses 94C corresponding to the recesses 94B to provide a pivot bearing 93C and a side edge 96C that can be used as a tear-out protection. The stop body 92C extends along the longitudinal narrow side 65, preferably to the attachment area 66B. Furthermore, the stop position AS is, so to speak, the normal position of the stop body 92C, namely in that the section of the stop body comprising the recesses 94C has a resilient property and thus constitutes a spring assembly 97C.

A connecting section 99C, to which a pivot section 92C1 of the stop body 92C is connected by means of the pivot bearing 93C, is used for fastening the stop body 92C to the rail body 61. The connecting section 99C engages in a receptacle 65E of the rail body 61 with a fir tree structure extending in the manner of a longitudinal groove along the longitudinal narrow side 65. The receptacle 65E has a receiving section 65F engaged by a cross-sectionally fir-tree-like elongated connecting pin 99C1 of the connecting section 99C. Towards the longitudinal narrow side 65, the receptacle 65E has a passage opening in front of which, in the meaning of a narrowing of the receptacle 65E, opposing rearward-engaging projections 65G project, which engage, for example, in groove-like rearward-engaging receptacles 99C2 extending parallel to the guide axis F of the connecting section 99C.

An opening stop 91D of the stop assembly 80D has a stop body 92D that extends along the longitudinal narrow side 65 to the attachment area 66B. The opening stop 91D is positively retained on the rail body 61, namely in the receptacle 65B thereof, and has the connecting section 99B explained in connection with the stop body 92B, which section engages in the receptacle 65B. Furthermore, the stop body 92D also has opposing recesses 94D which correspond to recesses 94B, 94C and accordingly form a pivot bearing 93D by means of which the opening stop 91D can be pivoted between the stop position AS and the release position FS about a pivot axis SF which is parallel to the guide axis F. In the area of the recesses 94D, the stop body 92D is elastic in that its normal position is the stop position AS, such that the pivot bearing 93D forms a spring arrangement 97D. The section of the stop body 92D that has the longitudinal ribs 99D forms a pivot section 92D1 pivotable between the release position FS and the stop position AS.

The protective cover 30 allows the opening stop 91D to be moved from the stop position AS toward the release position FS when its one actuating surface 98 forming the lower surface 98D is unsupported, for example, when the guide rail 60 is lifted off the workpiece W. The stop body 92D has multiple longitudinal ribs 99D extending parallel to the guide axis F and or parallel to the longitudinal narrow side 65 of the rail body 61. As a result, the stop body 92D has a higher bending stiffness parallel to the guide axis F. However, it is also possible that the groove-like spaces between the longitudinal ribs 99D allow the stop body 92D to have pivotable sections about multiple pivot axes SF1, SF2, SF3 parallel to the guide axis F and formed by the spaces or longitudinal grooves between the longitudinal ribs 99D.

Figure 8:
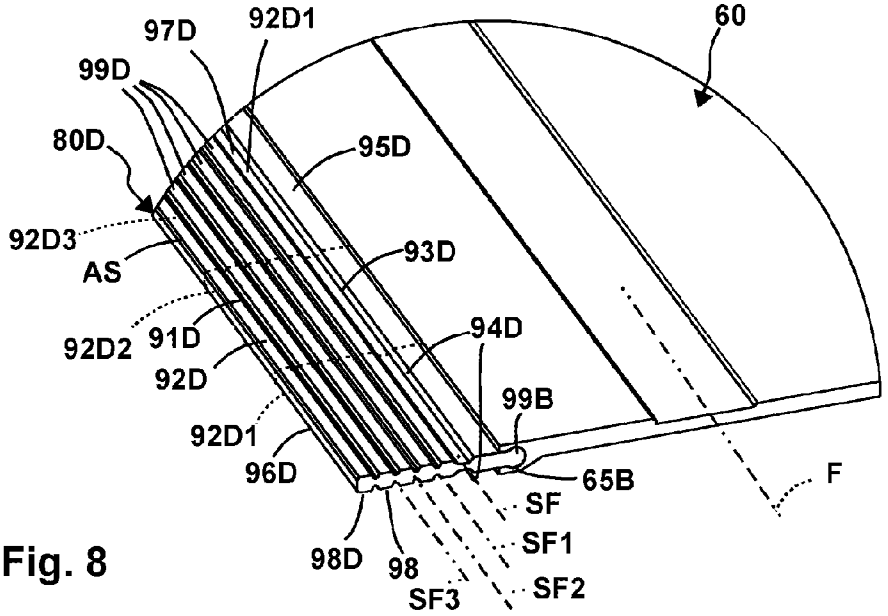
FIG. 8 shows a detailed view of a guide rail similar to FIGS. 6 and 7, but with an opening stop in a third variant.
Figure 9:
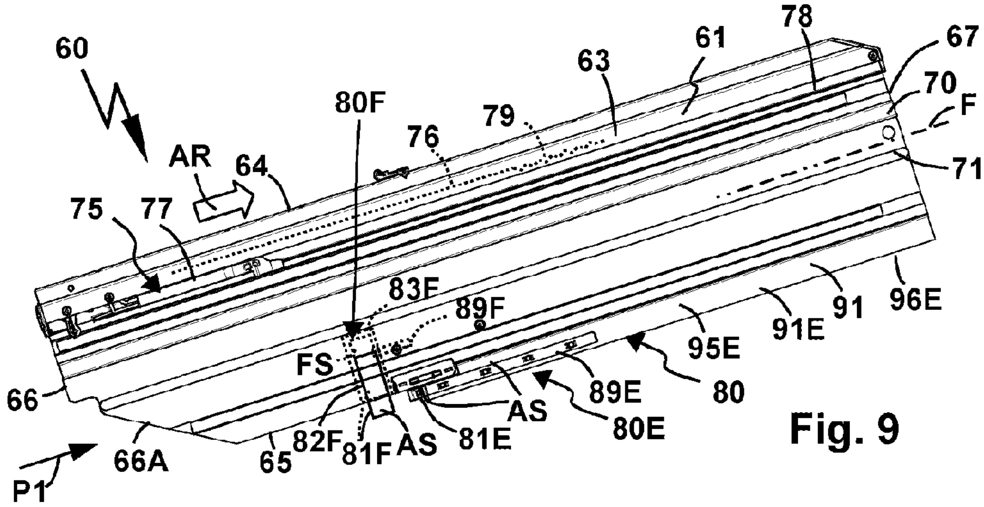
FIG. 9 shows an oblique perspective view from above of another guide rail.

However, it is also possible in a stop assembly according to the invention that multiple opening stops are arranged in a row arrangement next to each other and parallel to the guide axis F, and each of the opening stops is individually movable and/or movably mounted relative to a directly adjacent opening stop. For example, instead of the integral or one-piece stop body 92D, a row arrangement with multiple stop bodies 92D1, 92D2, 92D3 and optionally further stop bodies not visible in the drawing section of FIG. 8 can also be provided, each of which forming an opening stop and being individually movable between the release position FS and the stop position AS, as already described in connection with the opening stop 91D. Consequently, the protective cover 30 can displace each of the stop bodies 92D1, 92D2, 92D3 from the stop position AS into the release position FS if the actuating surface 98 of the respective stop body is not supported on a substrate, for example, on the workpiece surface WO.

The stop assembly 80E has opening stops 81E, 91E arranged in a row arrangement one behind the other with respect to a row axis parallel to the guide axis F or to the longitudinal narrow side 65. Unlike the stop bodies 92D1, 92D2, 92D3, the stop bodies 82E, 92E of the opening stops 81E, 91E are firmly connected to each other so that they can be pivoted simultaneously between the stop position AS and the release position FS by means of their respective pivot bearings 83E, 93E, which have coaxial pivot axes SF that are parallel to the guide axis F.

The opening stop 81E is pivotably mounted on a bearing body 84E of the pivot bearing 83E. The bearing body 84E is held, for example, on a bearing housing 85E, which is fastened to the resting surface 62 of the rail body 61 like the bearing housing 85A, for example screwed, glued or the like. The bearing body 84E may be pivotally or fixedly mounted to the bearing housing 85E.

Projections with, for example, sleeve-like or tubular bearing receptacles 84E1 project from the stop body 82E, which is plate-like, for example, and are penetrated by the bearing body 84E. The bearing body 84E is configured as a bearing pin or a bearing shaft, for example.

Figure 12:
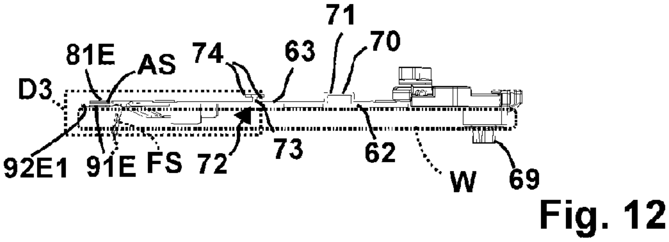
FIG. 12 shows a front view of the guide rail according to FIGS. 9-11, approximately in the direction of an arrow P1 in FIG. 9.
Figure 13:
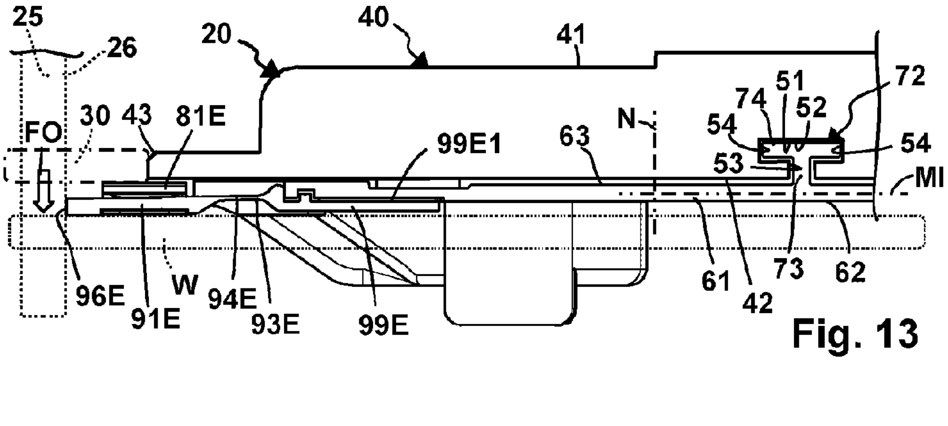
FIG. 13 shows a detail D3 from FIG. 12.

The stop body 92E is connected to the rail body 61 by a connecting section 99E. For example, the connecting section 99E is glued to the rail body 61 by means of an adhesive layer 99E1, an adhesive strip, or the like. Screwing or similar other fastening is easily possible as well. The pivot bearing 93E includes a film hinge 94E, such that a pivot section 92E1 of the stop body 92E is pivotable between the stop position AS and the release position FS, see FIG. 12.

When the stop assembly 80E rests on the workpiece W, in particular its workpiece surface WO, an actuating surface 88E which is arranged on a side, in particular lower surface, of the stop body 82E facing the resting surface 62 of the rail body 61, actuates the opening stop 81E in the direction of the stop position.

Furthermore, the actuating surface 98 provided on the lower surface 98E of the stop body 92E or formed by said lower surface also acts in the meaning of moving or holding the opening stop 91E in(to) the stop position AS when it is in contact with the workpiece W.

The stop body 82E and thus the opening stop 81E is also force-loaded in the direction of the stop position AS by a spring arrangement 87E. The spring arrangement 87E also acts on the stop body 92E or opening stop 91E in the direction of the stop position AS, since the opening stops 91E and 81E are firmly connected to each other.

The spring arrangement 87E comprises, for example, a torsion spring 87E1 which is supported on the one hand on the rail body 61, for example the bearing housing 85E, and on the other hand on the stop body 82E. The spring arrangement 87E is further provided to also actuate the stop body 92E or opening stop 91E to the stop position AS. Indeed, the stop body 82E projects with a support section 89E in the direction of the stop body 92E and is connected to the stop body 92E in the area of the support section 89E, for example glued and/or connected by means of rivets or other such connections 89E1.

The stop body 92E is preferably made of a soft material, for example rubber or plastic. For example, a first saw cut may form a side edge 98E that is used as a tear-out protection.

Figure 10:
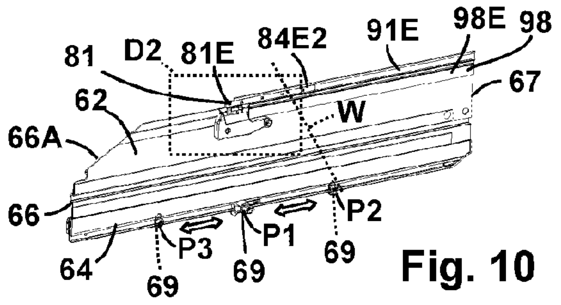
FIG. 10 shows the guide rail as in FIG. 9, but at an angle from below.
Figure 11:
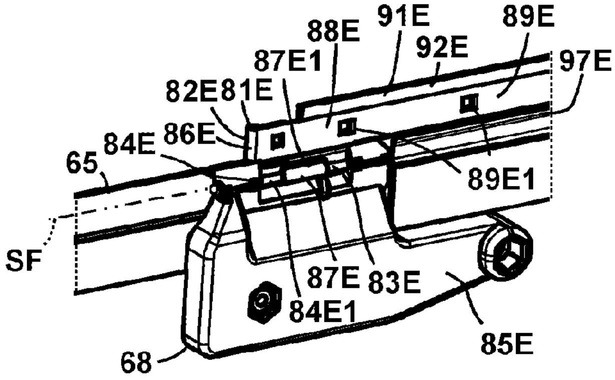
FIG. 11 shows a detail D2 from FIG. 9 with an enlarged stop assembly of the guide rail.

The stop body 92E is reinforced by the stop body 82E in the region of the support section 89E and, in any case, is flexurally rigid to such an extent that the opening stop 91E in the region of the support section 89E cannot be deformed by the protective cover 30 of the hand-held power tool 20. Thus, when a front longitudinal end portion 89E2 is supported on the workpiece W as indicated in FIG. 10, the combination of opening stops 81E, 91E is thereby supported in the stop position AS. In this situation, in which the initial area of the guide rail 60 projects freely in front of the workpiece W (for example, in front of the workpiece side WH), if the hand-held power tool 20 is moved forward in the working direction AR starting from the attachment area 66B of the guide rail 60, not only the opening stop 81E but also the opening stop 91E remains in the stop position AS. In doing so, the working tool 25 also moves along the side edge 96E of the stop body 92E in the area of the support section 89E, which can thus provide a tear-out protection.

However, when the system 10 is lifted from the workpiece W, the force FO applied by the protective cover 30 onto the upper surface 95E of the opening stop 91E, for example, by the weight force of the pendulum hood 91 and/or the force of the protective cover spring assembly 36, is sufficient to move the opening stops 81E and 91E toward the release position FS. Consequently, the force FO is greater than the force of the spring arrangement 87E.

An actuating bevel 86E of the opening stop 81E facilitates movement of the protective cover 30 in the direction of the open position O. The actuating bevel 86E is formed, for example, by an unflanged or formed section of the stop body 82E. The actuating bevel 86E faces the attachment area 66B.

At this point it should be mentioned that the stop body 82E is preferably made of metal. The stop body 82E is preferably designed as a stamped and bent part.

Another option is a slidable or linearly movable mounting of an opening stop of a stop assembly. For example, a stop assembly 80F has an opening stop 81F, for example a slider or stop body 82F, which is mounted on a slide bearing 83F so as to be linearly movable on the rail body 61 between a release position FS shown in dashed lines and a stop position AS shown in solid lines. It is possible that the stop body 82F can be fixed, in particular locked, in the stop position AS and/or the release position FS by means of a detent or other such fixing device 89F. A spring arrangement not shown can move the opening stop 81F to the stop position AS, for example.

The invention claimed is:

1. A guide rail for guiding a hand-held power tool, wherein the hand-held power tool has a drive motor, a working tool driven by the drive motor, and a protective cover for the working tool which can be moved between an open position exposing the working tool, and a covering position at least partially covering the working tool, wherein a rail body of the guide rail has, on opposite sides with respect to a center plane of the rail body, a resting surface for laying onto a base surface, of a workpiece, and a guide surface for guiding the hand-held power tool, on which guide surface a guide contour for guiding the hand-held power tool along a guide axis is arranged such that the working tool of the hand-held power tool, guided parallel to the guide axis, can cut into the workpiece in a working direction adjacently to a longitudinal narrow side of the rail body, and wherein the guide rail has a stop assembly having at least one opening stop for moving the protective cover into the open position when the hand-held power tool is moved along the guide axis and wherein the at least one opening stop can be moved on the rail body between a stop position for actuating the protective cover toward the open position and a release position for releasing the protective cover for movement toward the covering position, wherein the opening stop projects further from the longitudinal narrow side of the rail body, with a direction component parallel to the center plane of the rail body, in the stop position than in the release position, wherein the at least one opening stop has a lower surface, the at least one opening stop being in the stop position for actuating the protective cover toward the open position when the lower surface rests on the workpiece.

2. The guide rail of claim 1, wherein the at least one opening stop is movable between the stop position and the release position and/or pivotable about at least one pivot axis with respect to the rail body, wherein the pivot axis is parallel to the guide axis or extending obliquely or transversely, to the guide axis.

3. The guide rail of claim 1, wherein the stop assembly comprises at least two opening stops.

4. The guide rail of claim 3, wherein the at least two opening stops are mounted on the rail body with the same degrees of freedom of movement or with different degrees of freedom of movement with respect to the rail body for movement between the release position and the stop position and/or are deformable with respect to the rail body.

5. The guide rail of claim 3, wherein the at least two opening stops are arranged on the rail body in a row arrangement one behind the other with respect to the guide axis.

6. The guide rail of claim 5, wherein the opening stops are firmly connected or motion-coupled to one another.

7. The guide rail of claim 1, wherein the at least one opening stop comprises an opening stop or is formed by an opening stop which can be pivoted by means of a pivot bearing about a pivot axis parallel to the guide axis between the stop position and the release position, or has a pivot section which can be pivoted or deformed about a pivot axis parallel to the guide axis between the stop position and the release position.

8. The guide rail of claim 1, wherein the at least one opening stop for pivotal movement or deformation between the release position and the stop position has a longitudinal recess, and/or a film hinge, and/or is flexurally flexible.

9. The guide rail of claim 1, wherein the stop assembly has at least one opening stop which can be moved from the stop position into the release position by the hand-held power tool when said tool is guided on the guide rail.

10. The guide rail of claim 1, wherein the at least one opening stop has an actuating bevel for actuation by the hand-held power tool and/or for actuation of the protective cover.

11. The guide rail of claim 1, wherein the stop assembly has at least one opening stop which is spring-loaded in the direction of the stop position by a spring arrangement.

12. The guide rail of claim 11, wherein a spring force of the spring arrangement of the opening stop is smaller than a force of the protective cover of the hand-held power tool provided for operation with the guide rail, said force acting in the sense of moving the opening stop into the release position, said force being a spring force and/or a weight force.

13. The guide rail of claim 1, wherein the at least one opening stop has an actuating surface for actuating the opening stop in the direction of the stop position by the workpiece when the guide rail rests on the workpiece.

14. The guide rail of claim 1, wherein the at least one opening stop comprises an elongated stop body extending along the longitudinal narrow side of the guide rail and/or a row arrangement of multiple stop bodies arranged along the longitudinal narrow side of the guide rail.

15. The guide rail of claim 14, wherein the stop body is made of an elastic and/or flexurally flexible material, and/or has a hinge section.

16. The guide rail of claim 1, wherein the stop assembly has an opening stop which has sections with different bending stiffnesses arranged one behind the other with respect to the guide axis, and/or has at least two opening stops with different bending stiffnesses arranged one behind the other with respect to the guide axis.

17. The guide rail of claim 1, wherein the stop assembly has an opening stop with a flexurally rigid support section which extends parallel to the guide axis and whose front longitudinal end in the working direction is provided for resting on the workpiece in such a way, that, when the front longitudinal end of the support section rests on the workpiece, a rear longitudinal section of the support section which projects freely in front of the workpiece and is not supported by the workpiece is supported for holding in the stop position.

18. The guide rail of claim 1, wherein the at least one opening stop has a tear-out protection edge for resting on the workpiece and for preventing the workpiece from being torn out at a cutting edge introduced into the workpiece by the working tool.

19. The guide rail of claim 1, wherein the at least one opening stop has a cutting section provided for being cut off by the working tool, which cutting section is cut off by the working tool during a first use of the guide rail when the working tool is guided along the guide axis along the guide rail.

20. The guide rail of claim 1, further comprising an attachment area at which no body actuating the protective cover projects in front of the longitudinal narrow side of the rail body, such that the protective cover is freely movable between the release position and the covering position when the hand-held power tool is arranged at the attachment area.

21. The guide rail of claim 1, further comprising at least one rearward-engaging contour for engagement with a mating rearward-engaging contour of the hand-held power tool, such that the hand-held power tool is held on the guide rail in a normal direction with respect to the center plane of the guide rail, and/or wherein the guide rail further comprises at least one longitudinal end stop with respect to the guide axis for stopping the hand-held power tool during a movement in the working direction or against the working direction.

22. The guide rail of claim 1, further comprising a spring-loaded restoring device for adjusting the hand-held power tool in the direction of a rear longitudinal end region of the guide rail in the working direction.

23. A system comprising a guide rail of claim 1 and a hand-held power tool.

24. The system of claim 23, wherein the protective cover is spring-loaded in the direction of its covering position by a protective cover spring assembly.

25. A guide rail for guiding a hand-held power tool, wherein the hand-held power tool has a drive motor, a working tool driven by the drive motor, and a protective cover for the working tool which can be moved between an open position exposing the working tool, and a covering position at least partially covering the working tool, wherein a rail body of the guide rail has, on opposite sides with respect to a center plane of the rail body, a resting surface for laying onto a base surface, of a workpiece, and a guide surface for guiding the hand-held power tool, on which guide surface a guide contour for guiding the hand-held power tool along a guide axis is arranged such that the working tool of the hand-held power tool, guided parallel to the guide axis, can cut into the workpiece in a working direction adjacently to a longitudinal narrow side of the rail body, and wherein the guide rail has a stop assembly having at least one opening stop for moving the protective cover into the open position when the hand-held power tool is moved along the guide axis and wherein the at least one opening stop can be moved on the rail body between a stop position for actuating the protective cover toward the open position and a release position for releasing the protective cover for movement toward the covering position, wherein the opening stop projects further from the longitudinal narrow side of the rail body, with a direction component parallel to the center plane of the rail body, in the stop position than in the release position, wherein the at least one opening stop has a lower surface, the at least one opening stop being in the stop position for actuating the protective cover toward the open position when the lower surface rests on the workpiece, and wherein the at least one opening stop is pivotable between the stop position and the release position about at least one pivot axis with respect to the rail body, wherein the pivot axis is parallel to the guide axis.

26. A guide rail for guiding a hand-held power tool, wherein the hand-held power tool has a drive motor, a working tool driven by the drive motor, and a protective cover for the working tool which can be moved between an open position exposing the working tool, and a covering position at least partially covering the working tool, wherein a rail body of the guide rail has, on opposite sides with respect to a center plane of the rail body, a resting surface for laying onto a base surface, of a workpiece, and a guide surface for guiding the hand-held power tool, on which guide surface a guide contour for guiding the hand-held power tool along a guide axis is arranged such that the working tool of the hand-held power tool, guided parallel to the guide axis, can cut into the workpiece in a working direction adjacently to a longitudinal narrow side of the rail body, and wherein the guide rail has a stop assembly having at least one opening stop for moving the protective cover into the open position when the hand-held power tool is moved along the guide axis and wherein the at least one opening stop can be moved on the rail body between a stop position for actuating the protective cover toward the open position and a release position for releasing the protective cover for movement toward the covering position, wherein the opening stop projects further from the longitudinal narrow side of the rail body, with a direction component parallel to the center plane of the rail body, in the stop position than in the release position, wherein the at least one opening stop has a lower surface, the at least one opening stop being in the stop position for actuating the protective cover toward the open position when the lower surface rests on the workpiece, and wherein the at least one opening stop is pivotable between the stop position and the release position about at least one pivot axis with respect to the rail body, wherein the pivot axis is oblique with respect to the guide axis.

* * * * *